Sept. 28, 1965 R. D. STONE ETAL Re. 25,868
AIR COOLED SEAT CUSHION CONSTRUCTION
Original Filed Oct. 16, 1959
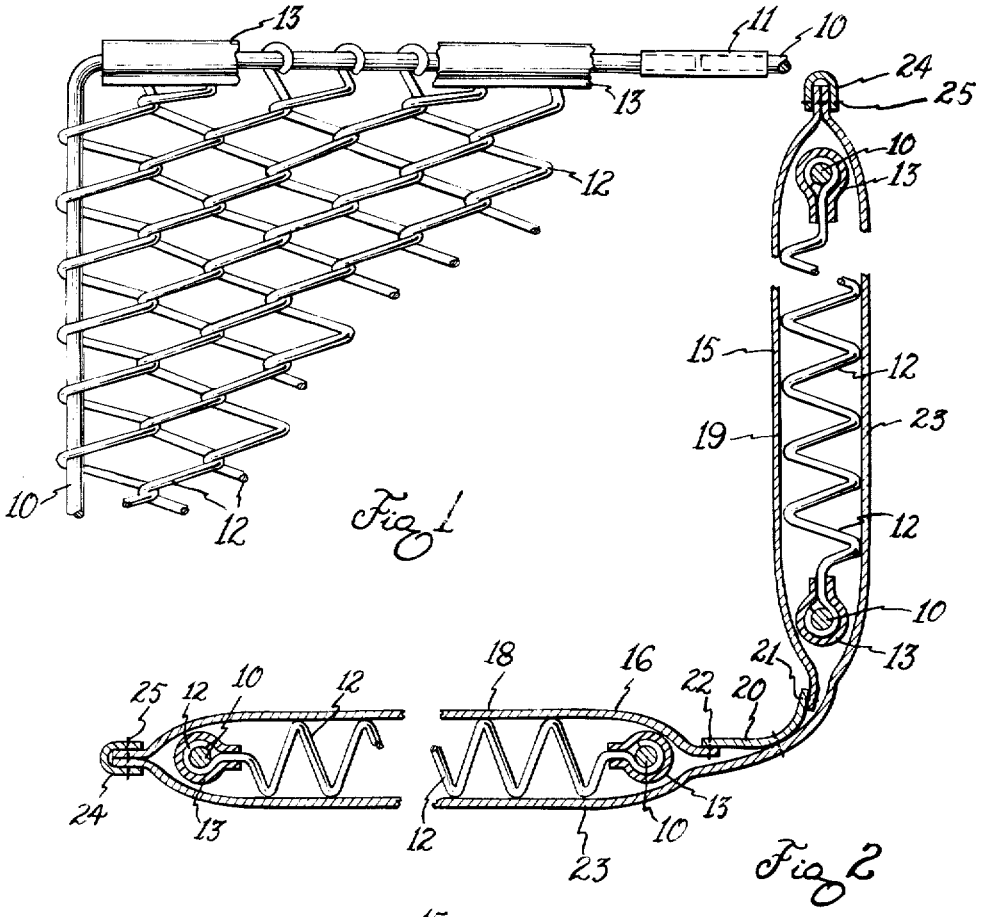
Fig 1
Fig 2
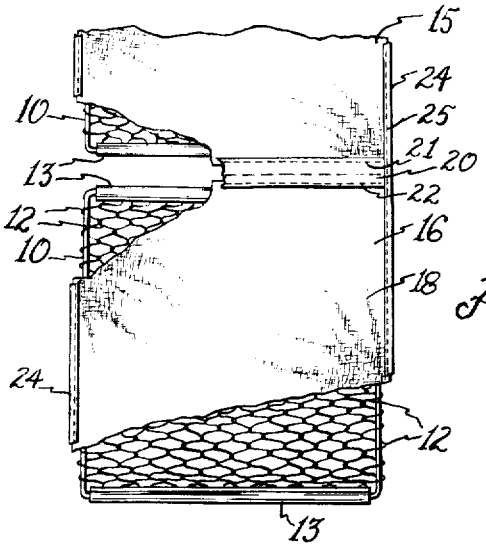
Fig 3
INVENTORS
Ralph Dudley Stone
BY John F. Cobb,
John J Bregina United States Patent Office Re. 25,868
Reissued Sept. 28, 1965

25,868

AIR COOLED SEAT CUSHION CONSTRUCTION

Ralph Dudley Stone, Fort Smith, and John F. Cobb, Van Buren, Ark., assignors, by mesne assignments, to Heckethorn Manufacturing Co., Dyersburg, Tenn., a corporation of Colorado Original No. 3,038,176, dated June 12, 1962, Ser. No. 846,858, Oct. 16, 1959. Application for reissue Aug. 7, 1964, Ser. No. 399,426
2 Claims. (Cl. 5—347)

Matter enclosed in heavy brackets [ ] appears in the original patent but forms no part of this reissue specification; matter printed in italics indicates the additions made by reissue.

Our invention relates to air cooled seat cushions of a type adapted for vehicles and providing for free circulation of air in any direction therethrough.

One of the important objects of our invention is to provide a ventilated seat cushion which is adapted to be selectively placed upon vehicle seats, and which embodies one or two connected seat cushions having a plurality of helical wire springs secured in a substantially parallel plane and with the opposite ends of said helical springs connected to opposite members of a relatively rigid metal wire frame; and in which the opposite ends of the helical springs, which are bent over the rigid frame members, are substantially enclosed and guarded by longitudinally extending channel-like metal clamps or binding members which are adapted to prevent detachment or disengagement of the spring ends from the wire frame members and to prevent projection of the ends of said helical springs through the upper and lower panels or coverings of said cushions.

A further important object of our invention is the provision of relatively inexpensive ventilated air cooled seat cushions wherein the cushion units comprise a plurality of interwoven and interlocked substantially parallel helical spring-like coils whose opposite ends are secured about opposite members of a relatively rigid wire frame, and longitudinally extending metal clamps or guards suitably secured about the opposite ends respectively of said helical springs to thereby prevent disengagement and removal of said spring ends and prevent their projection through the perforated panels of the cushions to thereby avoid damage or injury to persons or to the upholstery of the vehicles.

Other and further important objects of our invention will be apparent from the description of the following specifications and drawings.

On the drawings:

FIGURE 1 is an enlarged elevational and fragmentary view of a portion of a spring unit forming a part of our ventilated seat cushions, and illustrating the end portions of the helical springs hooked and secured about one end member of the rigid frame wire of said spring unit, and illustrating with the parts broken away, portions of one of the secured and protecting clamps secured about the ends of said springs.

FIGURE 2 is a cross-sectional view taken on a vertical plane, with parts broken away, of portions of two connected together ventilated seat cushions and illustrating the protecting clamps or guards secured about the opposite ends of the helical springs.

FIGURE 3 is a reduced elevational view showing one of our novel seat cushions, with the enclosing netting and covering as broken away, and showing a part of the second connected back cushion with parts broken away, and illustrating the securing and protecting clamps mounted about the ends of the helical coils and over the end members of the frame.

As shown on the drawings:

Numeral 10 designates a substantially rectangular metal frame preferably formed of relatively stiff wire, the ends of which are bent into alignment and adjacent each other and secured together by a metal sleeve or ferrule 11 which is pressed on said ends, as indicated at the upper right of FIGURE 1.

Numeral 12 designates a plurality of metal helical springs formed of wire and which are parallel and interwoven so that their adjacent convolutions are interlocked as illustrated. The two springs 12 adjacent the side members of the frame 10 have their convolutions woven over and about the two side members of the frame 10, as illustrated at the left of FIGURE 1. The opposite ends of said springs 12 are bent and doubled back and mounted, anchored and pressed over and about the opposite end members of the frame 10, as illustrated in FIGURES 1 and 2. Said anchorage and securance holds the said springs 12 under tension and in substantially a parallel frame.

In FIGURE 3 is illustrated also a portion of the spring unit forming part of the back cushion in addition to the spring unit of the seat cushion.

Secured by pressing around and about the opposite end portions of the frame 10 and about the hooked or anchored end portions of the springs 12 thereon are two channel-like metal flanged binding members or guards 13 which enclose and protect the bent over portions of springs 12. Said binding members 13 each are formed by positioning a sheet metal channel over each of the opposite end members of frame 10 and mechanically pressing the two flanges thereof together to thereby crimp and secure said flanges together and securely mount said binding members on the two opposite ends of each spring unit. Said binding members 13 prevent the hooked and bent over ends of the springs from coming off of the frame 10 and also prevent the ends of said springs 12 from piercing through and projecting from the covering of the seat cushions.

Numerals 15 and 16 designate two envelope-like containers or enclosures which are formed of meshed or netting fabric having numerous openings between the strands thereof. Numeral 23 is one continuous panel of open mesh fabric which forms the back of the back-rest cushion and the underside of the seat cushion. Numeral 18 designates a panel of mesh fabric forming normally the top side of the seat cushion. Numeral 19 designates a panel of mesh fabric normally forming the forward side of the back-rest cushion.

A transverse binding strip 20 has one of its lateral edges stitched by a line of stitching 21 to one edge of the back rest fabric panel 19, and also stitched by a line of stitching 22 to normally rear edge portion of the fabric seat panel 18.

Numeral 23 designates an elongated continuous fabric back panel which extends from beyond the normally upper end edge of the back-rest spring unit to points beyond the normally forward edge of the spring unit of the seat section.

As illustrated in FIGS. 2 and 3 a fabric binding tape 24 is folded over the adjacent upper edges of the fabric mesh panel 23 and the fabric mesh panel 19 and also over the adjacent lateral edges of said panels, and said folded over edge tape 24 is secured by stitching 25 which passes through and secures together the adjacent edge portions of said mesh panels.

The lines of stitching 21 and 22 also extend through the intermediate portion of the fabric back panel 23. Said folded tape 24 and lines of stitching 25 continue along and extend through the folded over reinforcing edge tape along the extending adjacent edges of the seat panel 18 and the adjacent edges of the fabric panel 23, and also along and through the normally forward adjacent edges of the fabric panels enclosing the seat section.

This results in the seat spring unit being enclosed and covered by an envelope-like pocket or container of mesh fabric and also in the back-rest section being enclosed within a connected envelope-like fabric container, said two fabric containers being pivotal relative to each other permitting selective positioning thereof at varying angles on various vehicle seats.

The provision of the said binding clamps or guards 13 in the manner described not only aids in holding the bent over ends of the springs 12 in their anchored position on said wire frames but also prevents the end of said springs from becoming detached from said rigid wire frames and prevents said spring ends from piercing and projecting from the mesh fabric panels 18 and 19, which otherwise would cause damage to persons' clothing and injury to occupants of said seats.

Our novel two section ventilated seat cushions provide a highly advantageous circulation of air below the seats and behind the backs of vehicle drivers and occupants and prevent undesirable sweating normally caused by the close contact of the person with the seats and with the seat-backs.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

We claim:

1. An air cooled seat and back cushion for vehicle seats comprising a seat section and a back section [; the opposite end portions of said helical springs of said seat section frame and of said back section frame being wound and bent over the opposite end portions of said frames respectively;] said seat section having a metal frame and a plurality of interwoven helical springs *bent over and* connected at their opposite ends *to the opposite ends* of said frame; said back section having a metal frame and interwoven helical springs *bent over and* connected to [oppostie] *opposite* ends of said back section frame; a pair of elongated channel-like metal clamping and binding members mounted over the opposite bent over connected ends of said springs of said seat section respectively; a pair of elongated channel-like metal clamping and binding members mounted over the connected bent over ends of said springs of said back section; said metal clamping and binding members being adapted to prevent unhooking and disengagement of said bent over ends of said springs from said frames; a fabric mesh covering for said seat section comprising an upper fabric panel and a normally lower panel connected together along their peripheral edges; and a fabric mesh covering for said back section comprising a forward fabric panel and a connected back fabric panel; said coverings and said sections being connected together and pivotal relative to each other.

2. In an air cooled seat cushion, a pair of substantially rectangular metal frames, each of said frames having opposite parallel side members; a plurality of interwoven adjacent helical springs having their opposite ends hooked over and connected to two opposite side members of each of said frames; a pair of elongated channel-like metal clamps securely mounted about said side members of one of said frames respectively, each of said elongated metal clamps having its opposite edge portions pressed against the hooked over spaced apart ends of said springs on each side member of said frames and extending substantially over the greater portions of said side members respectively; a pair of elongated channel-like metal clamps securely mounted about the opposite side members of said second frame and having its edge portions pressed against the hooked over opposite spaced apart ends of the said springs of said second frame; and a perforated covering enclosing said frames, said springs and said clamps; said covering extending beyond the periphery of said frames and being secured together along its peripheral edges respectively.

References Cited by the Examiner

The following references, cited by the Examiner, are of record in the patented file of this patent or the original patent.

UNITED STATES PATENTS

| | | | |
|---|---|---|---|
| 1,868,279 | 7/32 | Ehlenbeck | 5—270 X |
| 1,959,048 | 5/34 | Burch | 5—259 X |
| 2,103,553 | 12/37 | Reynolds | 155—182 |
| 2,804,912 | 9/57 | Pickard | 155—182 |

FOREIGN PATENTS

| | | |
|---|---|---|
| 299,984 | 9/54 | Switzerland. |

FRANK B. SHERRY, *Primary Examiner.*